(12) United States Patent
Teng et al.

(10) Patent No.: US 11,630,498 B2
(45) Date of Patent: Apr. 18, 2023

(54) POWERING METHOD AND POWERING SYSTEM FOR POWER OVER ETHERNET

(71) Applicant: REALTEK SEMICONDUCTOR CORPORATION, Hsinchu (TW)

(72) Inventors: Pengchao Teng, Jiangsu Province (CN); Mingcai Xu, Jiangsu Province (CN); Yulun Liu, Jiangsu Province (CN)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 228 days.

(21) Appl. No.: 16/998,879

(22) Filed: Aug. 20, 2020

(65) Prior Publication Data

US 2021/0278889 A1 Sep. 9, 2021

(30) Foreign Application Priority Data

Mar. 6, 2020 (CN) .......................... 202010153171.3

(51) Int. Cl.
 *G06F 1/28* (2006.01)
 *G06F 9/50* (2006.01)
(52) U.S. Cl.
 CPC .............. *G06F 1/28* (2013.01); *G06F 9/5094* (2013.01)
(58) Field of Classification Search
 CPC .................................. G06F 1/28; G06F 9/5094
 See application file for complete search history.

(56) References Cited

U.S. PATENT DOCUMENTS

| 8,301,913 B2 | 10/2012 | Diab et al. |
| 8,352,754 B2 | 1/2013 | Chin |
| 8,677,168 B2 * | 3/2014 | Pocklington .......... G06F 1/3206 |
| | | 713/340 |

(Continued)

FOREIGN PATENT DOCUMENTS

| CN | 105812147 | 7/2016 |
| CN | 107994999 | 5/2018 |
| CN | 109193653 | 1/2019 |

OTHER PUBLICATIONS

English abstract of CN107994999A.
English abstract of CN105812147A.
English abstract of CN109193653A.

*Primary Examiner* — Danny Chan
(74) *Attorney, Agent, or Firm* — WPAT, P.C., Intellectual Property Attorneys; Anthony King (57) ABSTRACT

The present invention provides a power supply system and power supply method thereof for Power over Ethernet. The power supply system is configured to: calculate a static allocation remaining power and a dynamic allocation remaining power of power sourcing equipment; and determine whether a consuming power of powered device is greater than the static allocation remaining power and the dynamic allocation remaining power. When the consuming power is less than or equal to the static allocation remaining power and is less than or equal to the dynamic allocation remaining power, the powering system is configured to perform a static powering procedure. When the consuming power is greater than the static allocation remaining power and is less than or equal to the dynamic allocation remaining power, the powering system is configured to perform a dynamic powering procedure.

18 Claims, 6 Drawing Sheets

(56) References Cited

U.S. PATENT DOCUMENTS

| | | | | |
|---|---|---|---|---|
| 2007/0136614 A1* | 6/2007 | Heath | ............... | H04L 12/10 |
| | | | | 713/300 |
| 2007/0162620 A1* | 7/2007 | Terry | ............... | H04L 12/10 |
| | | | | 709/253 |
| 2018/0228007 A1* | 8/2018 | Siefer | ............... | H05B 47/18 |

* cited by examiner

POWERING METHOD AND POWERING SYSTEM FOR POWER OVER ETHERNET

CROSS REFERENCE TO RELATED APPLICATIONS

This application claims priority of China application No. 202010153171.3 filed on Mar. 6, 2020, which is incorporated by reference in its entirety.

BACKGROUND

Field of the Invention

The present invention relates generally to a power supply method and a power supply system, more particularly, to a power supply method and a power supply system for Power over Ethernet (PoE).

Description of Related Art

In order to improve the flexibility of network equipment, Power over Ethernet (PoE) technology has been developed. Specifically, the PoE architecture is mainly composed of the power sourcing equipment (PSE) and the powered device (PD), whereas the PoE technology is mainly based on the network line, which is used to transmit data signals from the PSE to the PD and at the same time provide the DC power requested by the PD.

PoE technology has many advantages, such as: compatible with existing structured wiring methods; eliminating the construction and maintenance costs of additional power supply equipment, thereby reducing costs; flexible deployment, which is not limited by the equipment location; support for standard and non-standard equipment; and centralized power and management, thereby providing a higher security level, among the others.

In order to make PoE technology more widely used, how to safely, correctly and quickly supply power to the PD is an important goal of PoE technology. However, there is no PoE power supply mode which is safe, correct and efficient in the prior art.

BRIEF SUMMARY OF THE INVENTION

Some embodiments of the present invention provide a power supply method for use in Power over Ethernet (PoE). The power supply method includes: calculating a static allocation remaining power and a dynamic allocation remaining power of Power Sourcing Equipment (PSE); and determining whether a consuming power of Powered Device (PD) is greater than the static allocation remaining power and the dynamic allocation remaining power, wherein when the consuming power is less than or equal to the static allocation remaining power and is less than or equal to the dynamic allocation remaining power, performing a static power supply procedure; when the consuming power is greater than the static allocation remaining power and is less than or equal to the dynamic allocation remaining power, performing a dynamic power supply procedure.

Some embodiments of the present invention provide a power supply system for use in PoE. The power supply system includes a micro control unit (MCU) and a memory. The memory is configured to store a program, wherein the program, upon execution, causes the MCU to: calculate a static allocation remaining power and a dynamic allocation remaining power of PSE; and determine whether a consuming power of PD is greater than the static allocation remaining power and the dynamic allocation remaining power. The MCU performs a static power supply procedure when the consuming power is less than or equal to the static allocation remaining power and is less than or equal to the dynamic allocation remaining power. The MCU performs a dynamic power supply procedure when the consuming power is greater than the static allocation remaining power and is less than or equal to the dynamic allocation remaining power.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present invention are discussed in detail below. It should be appreciated, however, that the present invention provides many applicable inventive concepts that can be embodied in a wide variety of specific contexts. The specific embodiments discussed are merely illustrative and do not limit the scope of the disclosure.

To implement power over Ethernet (PoE) in a safe, correct and highly efficient way, the present invention provides a power supply system and power supply method, which can adjust the power supply mode in real time depending on different power consumption conditions.

Figure 1:
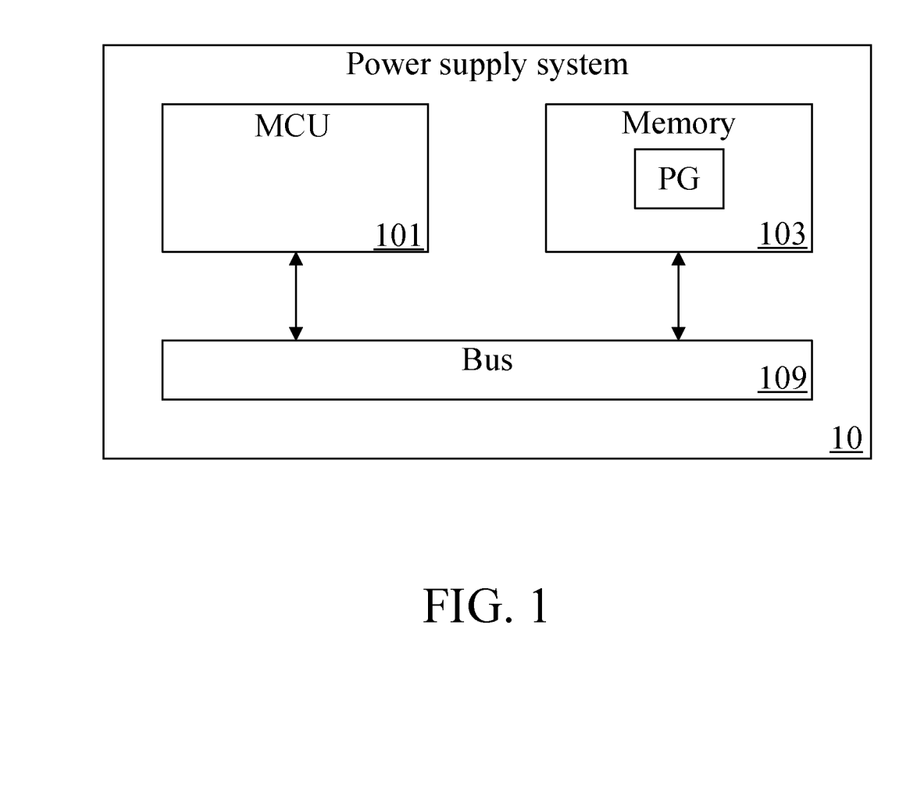
FIG. 1 is a block diagram illustrating a power supply system according to some embodiments of the present invention.

Please refer to FIG. 1, which is a block diagram illustrating a power supply system 10 according to some embodiments of the present invention. The power supply system 10 includes a micro control unit (MCU) 101 and a memory 103. The MCU 101 and memory 103 are electrically connected via a bus 109. Via the bus 109, the MCU 101 can execute a program PG stored in the memory 103. The program PG, upon execution, causes the MCU 101 to carry out the power supply function for use in PoE. The related power supply function is described in detail below.

Figure 2:
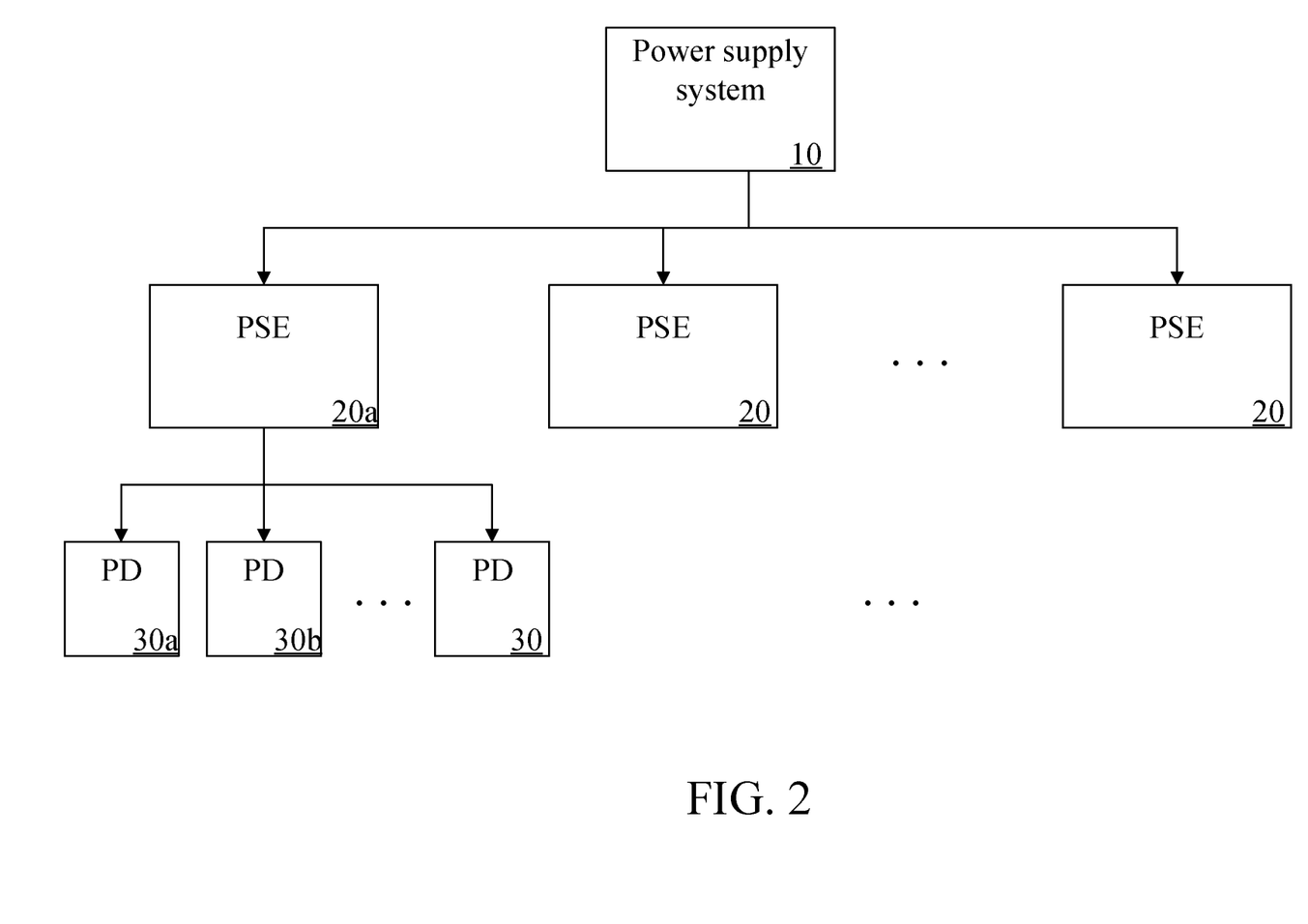
FIG. 2 is a schematic diagram illustrating operations of a power supply system according to some embodiments of the present invention.

Please refer to FIG. 2, in some embodiments, the power supply system 10 is connected with a plurality of power sourcing equipment (PSE) 20 and is configured to manage and control the PSE 20. In this case, each PSE 20 has a PSE chip and at least one power supply interface, configured to connect with a powered device (PD) 30 and control the power supplied to the PD. In some embodiments, the power supply system 10 is connected with the PSE 20 via an inter-integrated circuit bus (I2C BUS). The PSE 20 is connected with the PD 30 via the PoE network wire.

In some embodiments, the PSE 20 includes a PSE 20a. To facilitate the understanding to the technology of the present invention, PSE 20a is used as an example in the following description; however, this is not a limitation to the embodiments of the present invention. Specifically, the PSE 20a has a plurality of power supply interfaces, and upon the execution of the program PG, the MCU 101 first scan the plurality of power supply interfaces of the PSE 20a, and detect whether there is any PD 30 connected to the PSE 20a is requesting a power usage. In these embodiments, the MCU 101 detects that PD 30a, one of the PDs connected to one of the power supply interfaces, requests for power supply. Then, the MCU 101 calculates a static allocation remaining power and a dynamic allocation remaining power of the PSE 20a.

In some embodiments, the static allocation remaining power is a power of subtracting power allocated statically to the power supply interfaces from a total supply power of the PSE 20a. For example, when the total supply power of the PSE 20a is X watts, and the fixed static powers allocated to two power supply interfaces are Y watts and L watts, respectively, the static allocation remaining power is X minus Y and Z.

In some embodiments, the dynamic allocation remaining power is a power of subtracting power actually consumed by the power supply interfaces from the total supply power of the PSE 20a. For example, when the total supply power of the PSE 20a is X watts, and the sum of the real-time power actually consumed by all power supply interface is W watts, the dynamic allocation remaining power is X minus W.

Next, the MCU 101 selects a PD 30a, which has the request for power supply, from the power supply interfaces of the PSE 20a and determines whether a configuration setting of the PD 30a allows for power supply. In some embodiments, the configuration setting of the PD 30a can be stored in the PSE 20a connected thereto or in the memory 103. If the configuration setting of the PD 30a does not allow for power supply, then the MCU 101 selects the next PD 30 having a request for power supply to determine the configuration setting thereof. If the configuration setting of the PD 30a allows for power supply, then the MCU 101 further determines whether consuming power of the PD 30a is greater than the static allocation remaining power and dynamic allocation remaining power, so as to determine a power supply mode.

Specifically, when the MCU 101 determines that the consuming power of the PD 30a is less than or equal to the static allocation remaining power, and the consuming power of the PD 30a is less than or equal to the dynamic allocation remaining power, it means that the static allocation remaining power is still sufficient to support the consuming power of the PD 30a, and hence, the MCU 101 performs a static power supply procedure.

When the MCU 101 determines that consuming power of the PD 30a is greater than the static allocation remaining power, and the consuming power of the PD 30a is less than or equal to the dynamic allocation remaining power, it means that the static allocation remaining power is not sufficient to support the consuming power of the PD 30a, yet the dynamic allocation remaining power is still sufficient to support the consuming power of the PD 30a, and hence, the MCU 101 performs a dynamic power supply procedure.

When the MCU 101 determines that consuming power of the PD 30a is greater than the static allocation remaining power, and the consuming power of the PD 30a is greater than the dynamic allocation remaining power, it means that both the static allocation remaining power and the dynamic allocation remaining power are insufficient to support the consuming power of the PD 30a, and hence, the MCU 101 performs a no power supply procedure.

In some embodiments, the MCU 101 performs the static power supply procedure, which further includes the steps as follows. First, the PD 30 (such as, PD 30a or PD 30b) having a request for power supply is selected from the power supply interfaces of the PSE 20a, and then it is determined that whether the configuration setting of the selected PD 30 allows for power supply. If not, then the selected PD 30 is added into a no power supply list, and then the configuration of the next PD 30 having the request for power supply is determined.

On the other hand, if the configuration setting of the selected PD 30 allows for power supply, then the consuming power of the selected PD 30 is added to a total power consumption. Then, whether the total power consumption is greater than the static allocation remaining power is determined. In this case, when the total power consumption is less than or equal to the static allocation remaining power, the selected PD 30 is added into the power supply list. When total power consumption is greater than the static allocation remaining power, the selected PD 30 is added into the no power supply list.

After sequentially selecting the plurality of PDs 30 connected with the PSE 20a and determining the configuration thereof, the MCU 101 controls the PSE 20a to perform static power supply to the PD(s) 30 recorded in the power supply list. In other words, the MCU 101 controls the PSE 20a to provide to the PD(s) 30 recorded in the power supply list a power that is fixedly allocated to the interface corresponding to such PD(s) 30. On the other hand, the MCU 101 controls the PSE 20a to perform no power supply to PD(s) 30 recorded in the no power supply list.

In some embodiments, the MCU 101 performs a dynamic power supply procedure, which further includes the steps as follows. First, a time difference between an overall power supply time point, that the PSE 20a had provided overall power supply previously, and an instant time point is calculated. In other words, the time lapsed since the previous time that the PSE 20a performs the overall power supply till the current time is determined. In this case, when the time difference is less than a pre-determined power supply time interval, it means that the PD(s) 30 connected with the PSE 20a may not reach a status of power supply balance yet, and hence, no power supply procedure is performed.

On the other hand, when the time difference is greater than or equal to the pre-determined power supply time interval, it means that the PD(s) 30 connected to the PSE 20a has reached the status of power supply balance, and the following dynamic power supply procedure is further performed. First, a PD 30 (such as, PD 30a or PD 30b) having the request for power supply is selected from the power supply interfaces of the PSE 20a, and determines whether the configuration setting of the selected PD 30 allows for power supply. If not, the selected PD 30 is added into the no power supply list, and the configuration setting of the next PD 30 having the request for power supply is determined.

On the other hand, if the configuration setting of the selected PD 30 allows for power supply, then the consuming power of the selected. PD 30 is added to the total power consumption. Next, whether the total power consumption is greater than the dynamic allocation remaining power is determined. In this case, when the total power consumption is less than or equal to the dynamic allocation remaining power, then the selected PD 30 is added into the power supply list. When the total power consumption is greater than the dynamic allocation remaining power, then the selected PD 30 is added into the no power supply list.

After sequentially selecting the plurality of PDs 30 connected with the PSE 20a and determining the configuration thereof, the MCU 101 controls the PSE 20a to perform dynamic power supply to the PD(s) 30 recorded in the power supply list. In other words, the MCU 101 controls the PSE 20*a* to provide to the PD(s) 30 recorded in the power supply list a power that is dynamically allocated to the interface corresponding to such PD(s) 30. On the other hand, the MCU 101 controls the PSE 20*a* to perform no power supply to PD(s) 30 recorded in the no power supply list.

Some embodiments of the present invention provide power supply methods for supplying power in the PoE architecture, and the flowcharts thereof are shown in FIGS. 3A to 3D. The power supply methods of these embodiments are implemented by a power supply system (such as the power supply system 10 of the above-mentioned embodiments). The power supply system is connected with at least one PSE. Detailed operations of the methods are discussed below.

Figure 3A:
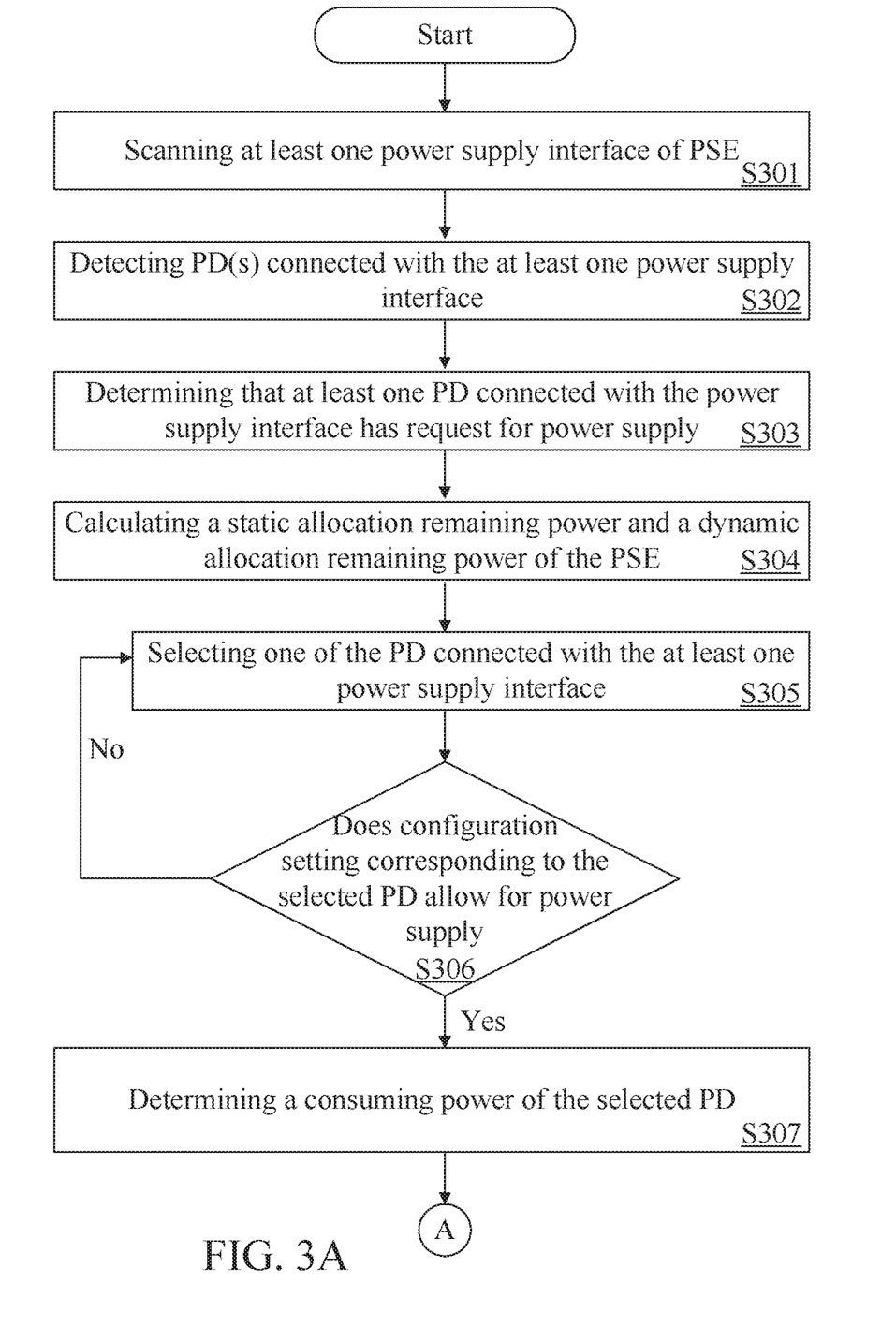
FIGS. 3A to 3D are flowchart diagrams of a power supply method according to some embodiments of the present invention.

First, in step S301 is executed to scanning at least one power supply interface of the PSE. Step S302 is executed to detect PD(s) connected with the at least one power supply interface. Step S303 is executed to determine that at least one PD connected with the power supply interface has a request for power supply. Step S304 is executed to calculate a static allocation remaining power and a dynamic allocation remaining power of the PSE.

Next, step S305 is executed to select one of the PD connected with the at least one power supply interface. Step S306 is executed to determine whether a configuration setting corresponding to the selected PD allows for power supply. If not, step S305 is repeated to select the next PD. If yes, step S307 is executed to determine a consuming power of the selected PD.

Figure 3B:
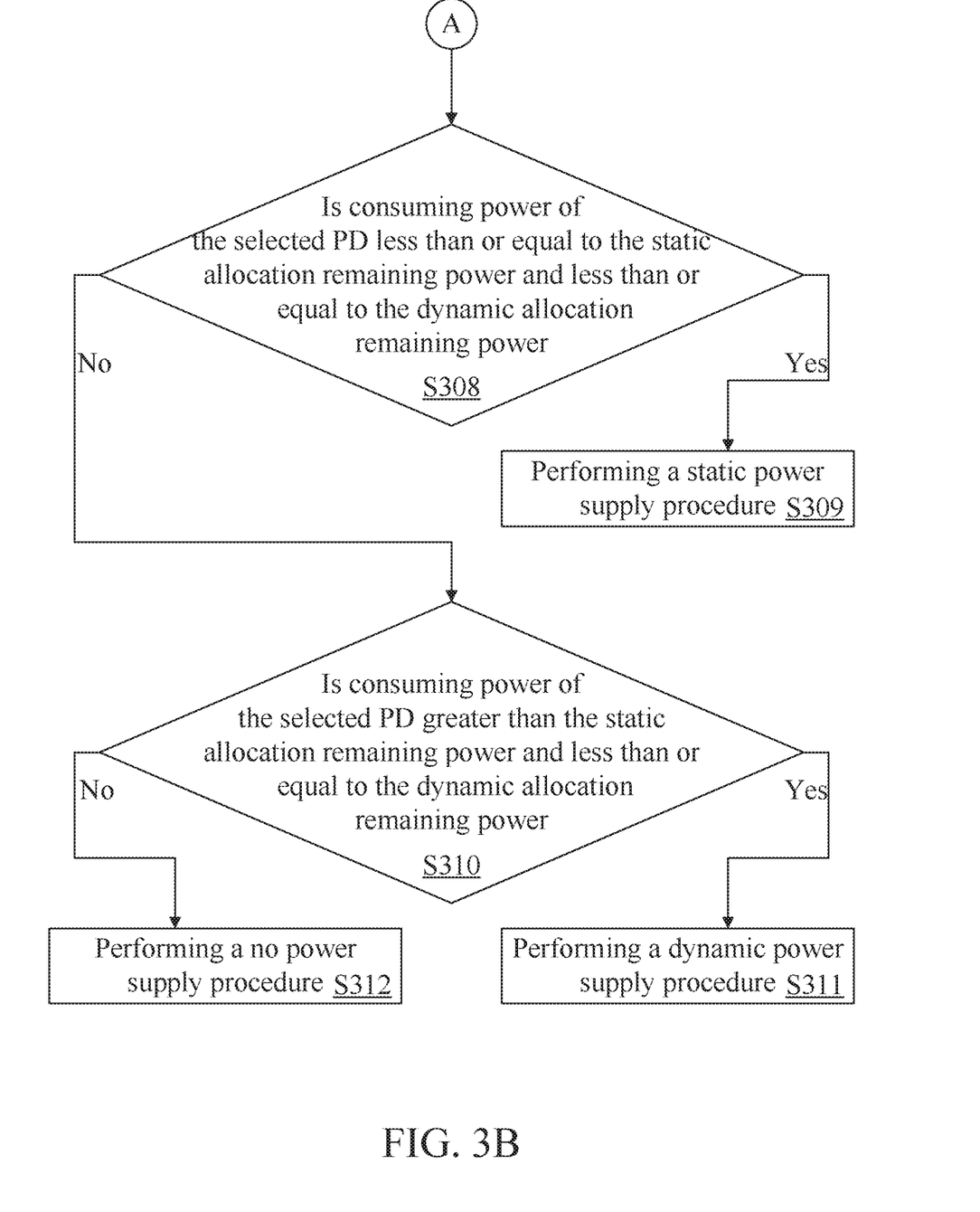

Then, step S308 is executed to determine whether the consuming power of the selected PD is less than or equal to the static allocation remaining power and is less than or equal to the dynamic allocation remaining power. If yes, step S309 is executed to perform a static power supply procedure. If not, step S310 is executed to determine whether the consuming power of the selected PD is greater than the static allocation remaining power and is less than or equal to the dynamic allocation remaining power. If yes, step S311 is executed to perform a dynamic power supply procedure. If not, step S312 is executed to perform no power supply procedure.

Figure 3C:
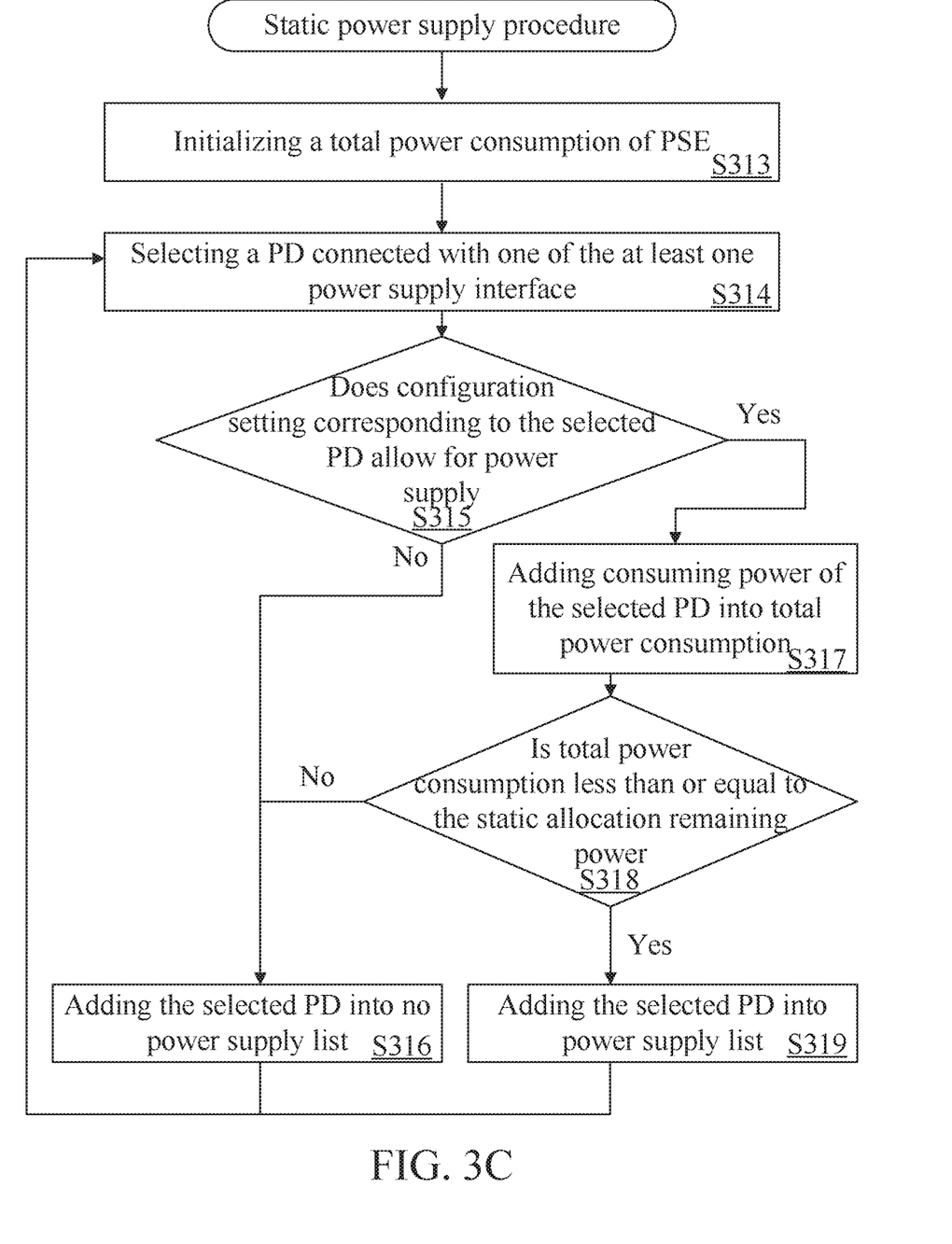

During the static power supply procedure, step S313 is executed to initialize a total power consumption of the PSE (such as, setting the total power consumption to zero). Step S314 is executed to select a PD connected with one of the at least one power supply interface. Step S315 is executed to determine whether the configuration setting corresponding to the selected PD allows for power supply. If not, step S316 is executed to add the selected PD into a no power supply list, and step S314 is executed to select a next PD.

If the configuration setting corresponding to the selected PD allows for power supply, step S317 is executed to add the consuming power of the selected PD into the total power consumption. Step S318 is executed to determine whether the total power consumption is less than or equal to the static allocation remaining power. If yes, step S319 is executed to add the selected PD into the power supply list, and then step S314 is executed to select a next PD. If not, step S316 is executed to add the selected PD into the no power supply list, and then step S314 is executed to select a next PD.

After sequentially selecting the PDs connected with the PSE and determining the configuration thereof, the power control system controls the PSE to perform static power supply to the PD(s) recorded in the power supply list. In other words, the power control system controls the PSE to provide to the PD(s) recorded in the power supply list a power that is fixedly allocated to the interface corresponding to such PD(s). On the other hand, the power control system controls the PSE to perform no power supply to PD(s) recorded in the no power supply list.

Figure 3D:
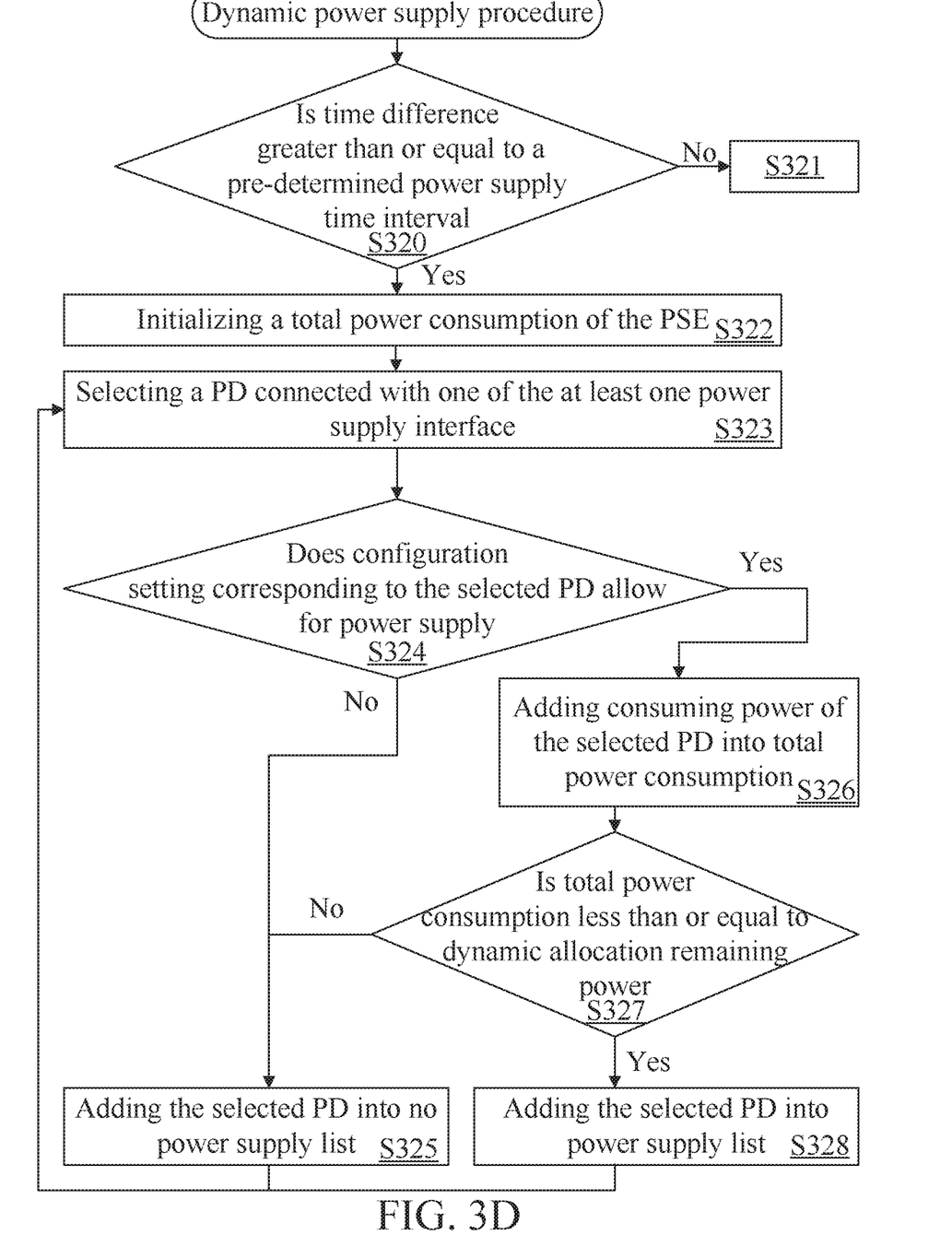

During the dynamic power supply procedure, step S320 is executed to calculate whether a time difference between an overall power supply time point and an instant time point is greater than or equal to a pre-determined power supply time interval. If not, step S321 is executed to perform no power supply procedure. If yes, step S322 is executed to initialize a total power consumption of the PSE (such as, setting the total power consumption to zero). Step 323 is executed to select a PD connected with one of the at least one power supply interface. Then, step S324 is executed to determine whether the configuration setting corresponding to the selected PD allows for power supply. If not, step S325 is executed to add the selected PD into a no power supply list, and step S323 is executed to select a next PD.

If the configuration setting corresponding to the selected PD allows for power supply, step S326 is executed to add the consuming power of the selected PD into the total power consumption. Then, step S327 is executed to determine whether the total power consumption is less than or equal to the dynamic allocation remaining power. If yes, step S328 is executed to add the selected PD into the power supply list, and then step S323 is executed to select a next PD is selected. If not, step S325 is executed to add the selected PD into the no power supply list, and step S323 is executed to selected a next PD.

After sequentially selecting the plurality of PDs connected with the PSE and determining the configuration thereof, the power supply system controls the PSE to perform dynamic power supply to the PD(s) recorded in the power supply list. In other words, the power supply system controls the PSE to provide to the PD(s) recorded in the power supply list a power that is dynamically allocated to the interface corresponding to such PD(s) depending on the needs thereof. On the other hand, the power supply system controls the PSE to perform no power supply to PD(s) recorded in the no power supply list.

It should be noted that in some embodiments, the MCU of the mentioned powering system includes logic circuit such as central processing units (CPUs) capable of carrying out computation and instructions. The memory of the mentioned powering system includes non-volatile memory. However, this is not a limitation to the embodiments of the implementations of the hardware components of the present invention.

This invention described above may be implemented as appropriate hardware component, software component, and/or combination of hardware components and software components. At least part of this invention can be optionally implemented as software which is running on one or more data processors, digital signal processors or configurable module elements (e.g., Field Programmable Gate Arrays).

While this invention has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the invention by simply employing the elements of the independent claims. Accordingly, embodiments of the invention as set forth herein are intended to be illustrative, not limiting. Various changes may be made without departing from the spirit and scope of the invention.

What is claimed is:

1. A power supply method for use in Power over Ethernet (PoE), comprising:
   calculating a static allocation remaining power and a dynamic allocation remaining power of a power sourcing equipment (PSE), wherein the PSE includes a PSE chip and at least one power supply interface;
   scanning the at least one power supply interface of the PSE;
   detecting that one of the at least one power supply interface is connected with a first powered device (PD) of at least one PD via a PoE network wire; and
   determining whether a first consuming power of the first PD of at least one PD is greater than the static allocation remaining power and the dynamic allocation remaining power, wherein:
      performing a static power supply procedure when the first consuming power is less than or equal to the static allocation remaining power and the first consuming power is less than or equal to the dynamic allocation remaining power; and
      performing a dynamic power supply procedure when the first consuming power is greater than the static allocation remaining power and the first consuming power is less than or equal to the dynamic allocation remaining power.

2. The power supply method of claim 1, further comprising:
   performing a no power supply procedure when the first consuming power is greater than the static allocation remaining power and the first consuming power is greater than the dynamic allocation remaining power.

3. The power supply method of claim 1, wherein performing the static power supply procedure further comprises:
   adding a second consuming power of a second PD of the at least one PD to a total power consumption;
   determining whether the total power consumption is greater than the static allocation remaining power, wherein:
      adding the second PD into a power supply list when the total power consumption is less than or equal to the static allocation remaining power; and
      adding the second PD into a no power supply list when the total power consumption is greater than the static allocation remaining power.

4. The power supply method of claim 1, wherein performing the dynamic power supply procedure further comprises:
   calculating a time difference between an overall power supply time point and an instant time point, wherein:
      performing a no power supply procedure when the time difference is less than a pre-determined power supply time interval.

5. The power supply method of claim 4, wherein performing the dynamic power supply procedure when the time difference is greater than or equal to the pre-determined power supply time interval further comprises:
   adding a second consuming power of a second PD of the at least one PD to a total power consumption;
   determining whether the total power consumption is greater than the dynamic allocation remaining power, wherein:
      adding the second PD into a power supply list when the total power consumption is less than or equal to the dynamic allocation remaining power; and
      adding the second PD into a no power supply list when the total power consumption is greater than the dynamic allocation remaining power.

6. The power supply method of claim 1, wherein the static allocation remaining power is a power of subtracting power allocated to at least one power supply interface from a total supply power of the PSE.

7. The power supply method of claim 1, wherein, the dynamic allocation remaining power is a power of subtracting power actually consumed by at least one power supply interface from a total supply power of the PSE.

8. The power supply method of claim 1, further comprising:
   determining a configuration setting corresponding to the first PD to allow power supply.

9. The power supply method of claim 8, further comprising:
   determining the first consuming power of the first PD connected with one of the at least one power supply interface.

10. A power supply system for use in power over Ethernet (PoE), comprising:
    a micro control unit (MCU); and
    a memory, configured to store a program that, when being executed, causes the MCU to:
       calculate a static allocation remaining power and a dynamic allocation remaining power of a power sourcing equipment (PSE), wherein the PSE includes a PSE chip and at least one power supply interface;
       scan the at least one power supply interface of the PSE;
       detect that one of the at least one power supply interface is connected with a first powered device (PD) of at least one PD via a PoE network wire; and
       determine whether a first consuming power of the first PD of at least one PD is greater than the static allocation remaining power and the dynamic allocation remaining power, wherein:
          perform a static power supply procedure, when the first consuming power is less than or equal to the static allocation remaining power and the first consuming power is less than or equal to the dynamic allocation remaining power; and
          perform a dynamic power supply procedure, when the first consuming power is greater than the static allocation remaining power and the first consuming power is less than or equal to the dynamic allocation remaining power.

11. The power supply system of claim 10, wherein the program, when being executed, further causes the MCU to:
    perform a no power supply procedure when the first consuming power is greater than the static allocation remaining power and the first consuming power is greater than the dynamic allocation remaining power.

12. The power supply system of claim 10, wherein performing the static power supply procedure further comprises:
    adding a second consuming power of a second PD of the at least one PD to a total power consumption;
    determining whether the total power consumption is greater than the static allocation remaining power, wherein:
       adding the second PD into a power supply list when the total power consumption is less than or equal to the static allocation remaining power; and adding the second PD into a no power supply list when the total power consumption is greater than the static allocation remaining power.

13. The power supply system of claim 10, wherein performing the dynamic power supply procedure further comprises:
calculating a time difference between an overall power supply time point and an instant time point, wherein:
performing a no power supply procedure when the time difference is less than a pre-determined power supply time interval.

14. The power supply system of claim 13, wherein, when performing the dynamic power supply procedure when the time difference is greater than or equal to the pre-determined power supply time interval further comprises:
adding a second consuming power of a second PD of the at least one PD to a total power consumption;
determining whether the total power consumption is greater than the dynamic allocation remaining power, wherein:
adding the second PD into a power supply list when the total power consumption is less than or equal to the dynamic allocation remaining power; and
adding the second PD into a no power supply list when the total power consumption is greater than the dynamic allocation remaining power.

15. The power supply system of claim 10, wherein, the static allocation remaining power is a power of subtracting power allocated to at least one power supply interface from a total supply power of the PSE.

16. The power supply system of claim 10, wherein, the dynamic allocation remaining power is a power of subtracting power actually consumed by at least one power supply interface from a total supply power of the PSE.

17. The power supply system of claim 10, the execution of the program further causes the MCU to:
determine a configuration setting corresponding to the first PD to allow power supply.

18. The power supply system of claim 17, the execution of the program further causes the MCU to:
determine the first consuming power of the first PD connected with one of the at least one power supply interface.

* * * * *